United States Patent

Nishiyori et al.

[11] 3,800,648
[45] Apr. 2, 1974

[54] APPARATUS FOR INTERCHANGING SHEET-METAL SLITTING EQUIPMENTS

[75] Inventors: Kyutaro Nishiyori; Masahiro Okada, both of Fukuoka, Japan

[73] Assignee: Kabushiki Kaisha Watanabe Kekkosho, Fukuoka, Japan

[22] Filed: Aug. 10, 1972

[21] Appl. No.: 279,624

[52] U.S. Cl. ............... 83/479, 72/239, 83/481, 83/698, 83/926 G
[51] Int. Cl. ............................. B23d 19/06
[58] Field of Search ............ 83/479, 481, 563, 698, 83/699, 700, 701, 926 G; 72/239

[56] References Cited
UNITED STATES PATENTS

| 3,408,886 | 11/1968 | David | 83/479 X |
| 2,996,025 | 8/1961 | Georgeff | 83/701 X |
| 3,566,498 | 3/1971 | Kato et al. | 72/239 |
| 3,452,632 | 7/1969 | Brolund | 83/701 X |
| 3,212,430 | 10/1965 | Clements | 83/563 X |

FOREIGN PATENTS OR APPLICATIONS

| 1,502,963 | 5/1969 | Germany | 83/563 |

*Primary Examiner*—Roy Lake
*Assistant Examiner*—James F. Coan
*Attorney, Agent, or Firm*—Wenderoth, Lind & Ponack

[57] ABSTRACT

An apparatus for interchanging sheet-metal equipments includes a main track formed by a pair of parallel rails on which one of the slitting equipments is normally placed, and two side-tracks each formed by a pair of parallel rails on one of which the other of the slitting equipments is normally placed and through which the slitting equipments interchange. The side-tracks are mounted on a wheeled truck movable perpendicular with respect to the main track so that selected one of the side-tracks is allowed to come in alignment with the main track. The said one of the slitting equipments on the main track is in a slitting position thereof, and the other slitting equipment on one of the side-tracks is in a stand-by position thereof.

When it is desired to interchange the slitting equipments, the slitting equipment in the slitting position is required to run on the main track onto the other side-track and thereafter the side-track bearing truck is shifted to allow the said one of the side tracks carrying the other slitting equipment to be brought into alignment with the main track, thus allowing the other slitting equipment to travel on the main track into the slitting position.

3 Claims, 6 Drawing Figures

APPARATUS FOR INTERCHANGING SHEET-METAL SLITTING EQUIPMENTS

BACKGROUND OF THE INVENTION

This invention relates to an apparatus for interchanging sheet-metal slitting equipment.

An object of the invention is to provide an apparatus for interchanging sheet-metal slitting equipment, wherein one of the slitting machines which is in a slitting position thereof can be rapidly exchanged with the other, spare slitting machine with ease.

Another object of the invention is to provide an apparatus for interchanging sheet-metal slitting equipment, wherein a selected one of the slitting machines can be fixedly secured in the slitting position thereof easily and rapidly, resulting in an improvement of the slitting operation.

SUMMARY OF THE INVENTION

In accordance with the invention, an apparatus for interchanging sheet-metal slitting equipment comprises a main track formed by a pair of parallel rails for guiding selected one of the slitting machines on wheels between a slitting position and a stand-by position thereof. The main track is provided with rail portions vertically movable relative to the remainder and positioned so that, when the wheels of the selected slitting equipment ride thereon, the selected slitting equipment is precisely in the slitting position thereof. When the selected slitting equipment is in the stand-by position, the same rides at its wheels on one of two side-tracks, each of which is mounted on a truck movable in a perpendicular direction with respect to the main track so as to bring either of the side-tracks in alignment with the main track. When the selected one of the slitting machines is in the slitting position, the same at first rides on and is carried at the wheels thereof by the rail portions of the main track, each of the rail portions movable downwardly and upwardly to allow the selected slitting equipment to be lowered and raised correspondingly.

When it is desired to maintain the selected slitting equipment fixedly secured in the slitting position thereof, an operator is required only to lower the rail portions, the selected slitting equipment being carried at its base by a stationary support instead of the rail portions. It be preferable that a clamp means is provided between the base of the slitting equipment and the stationary support therefor to more firmly hold the slitting equipment in the slitting position. When it is desired to exchange the slitting equipment in the slitting position with the spare slitting equipment in the stand-by position, the operator is required to move the side-track bearing truck so as to bring one side-track, on which the spare slitting equipment is not carried, into alignment with the main track, then to move the used slitting equipment in the slitting position along the main track onto the said one side-track, and thereafter to move the spare slitting equipment into the slitting position along the main track after bringing the other side-track, on which the spare slitting equipment is carried, into alignment with the main track.

BRIEF DESCRIPTION OF THE DRAWINGS

The invention will become more readily apparent from the following detailed description taken in conjunction with the accompanying drawings in which.

DETAILED DESCRIPTION OF THE EMBODIMENT

Figure 1:
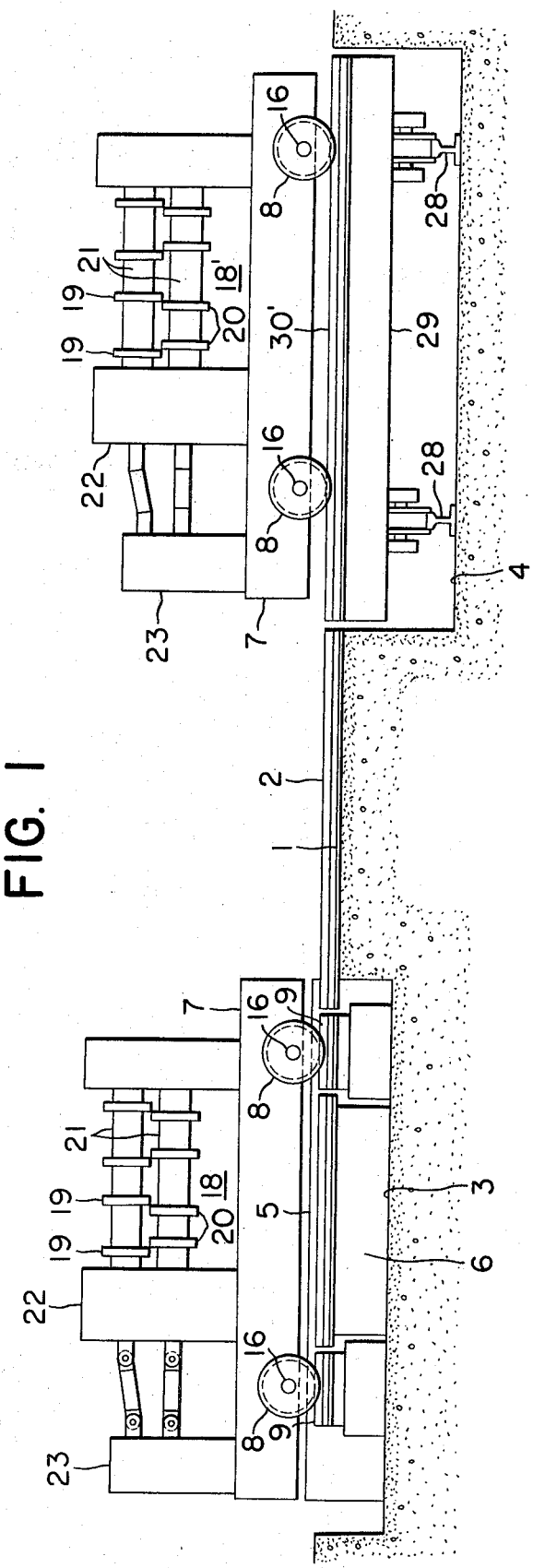
FIG. 1 is a front elevational view of an apparatus for interchanging sheet-metal slitting equipments according to the invention.
Figure 2:
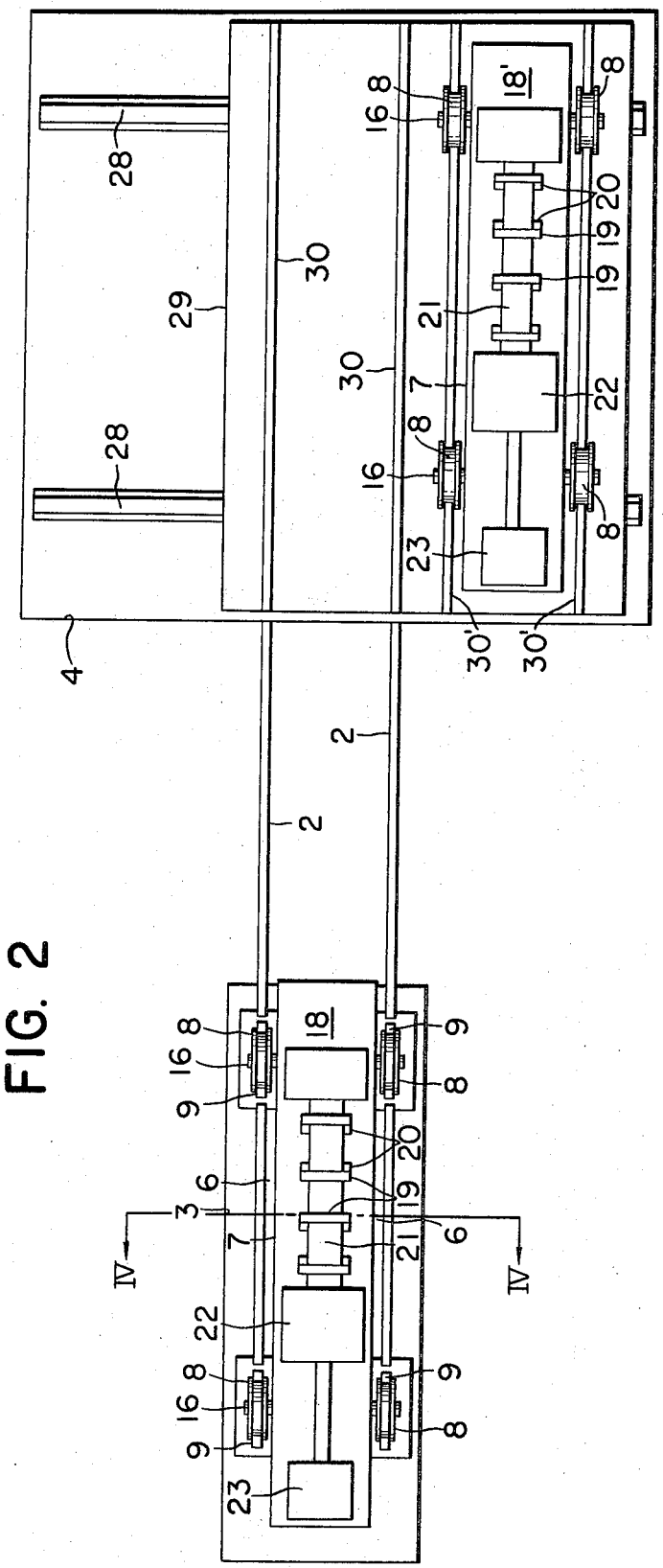
FIG. 2 is a plan view of the apparatus of FIG. 1.

Referring to the drawings, and particularly to FIGS. 1 and 2, an apparatus for interchanging slitting machines 18 and 18' is shown installed on a floor 1. The apparatus comprises a main track formed by a pair of parallel rails 2 fixedly mounted on the floor 1 in a conventional manner, on which the slitters 18 or 18' having a plurality of rotatable wheels 8 can travel.

The slitters 18 and 18' and include a base or bed 7 to which the two pairs of the wheels 8 are mounted for rotation through shafts 16 in a conventional manner, upper and a lower spaced shafts 21 which include a plurality of disk type slitting elements 19 and 20, a support 22 for rotatably supporting the shafts 21, and a driving means 23 for driving the shafts 21, the support 22 and the driving means 23 being mounted on the base 7.

The floor 1 is provided with a recess 3 substantially across which the main track 2 extends. Each rail is provided with rail portions 9 separable from the remainder and spaced apart a distance substantially equal to the distance between the two wheels 8 mounted on the separate shafts 16. The rail portions 9 are so arranged that, when each wheel 8 of the slitter 18 or 18' rides on the associated rail portion 9, the slitter 18 or 18' just occupies a slitting position thereof. Within the recess 3 between the rails 2, a support structure 5 is mounted which is able to support the slitter 18 or 18' as hereinafter illustrated. Each rail 2 between the separable rail portions 9 is supported by a bed 6 provided in the recess 3. With respect to means for movably supporting the rail portion 9, descriptions thereof will be made hereinafter in conjunction with FIGS. 4 to 6.

The floor 1 is further provided with a similar recess 4 on the side of the main track 2 opposite to the recess 3. On the bottom of the recess 4, a pair of parallel rails 28 are positioned in a normally intersection relation to the extenstion of the main track 2. Disposed on the rails 28 is a wheeled truck 29 which is provided with a pair of side-tracks 30 and 30', each side-track being formed by a pair of parallel rails extending in the same direction as the main track 2 and spaced apart by the same distance as the rails 2. The upper surface of the wheeled truck 29 is flush with the surface of the floor 2 so that, when either the side-track 30 or 30' on the truck 29 is brought into alignment with the main track 2, the slitter 18 or 18' can move between a slitting position on the main track and a stand-by position on the side-track 30 or 30'. The spare slitter 18' is generally disposed on either the side-track 30 or 30'.

Figure 4:
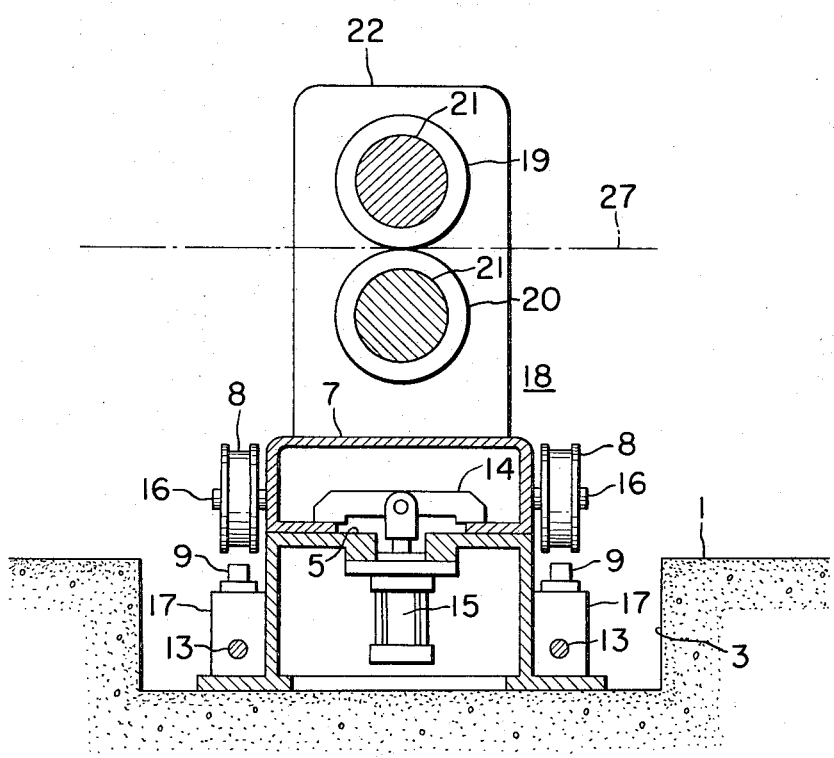
FIG. 4 is a longitudinal sectional view, on an enlarged scale, through the slitting equipment in a slitting position thereof, taken on the line IV — IV of FIG. 2.
Figure 5:
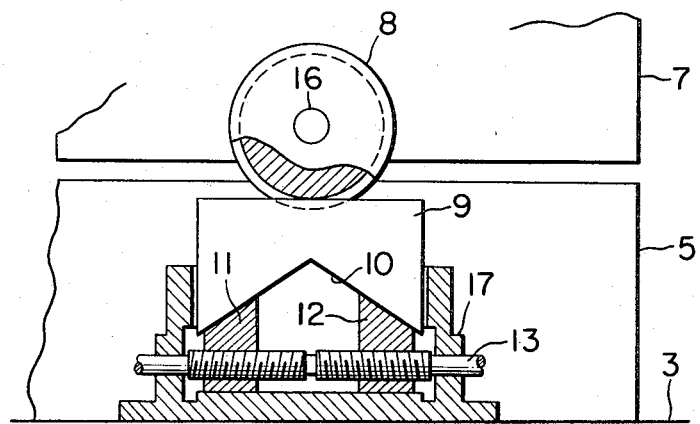
FIG. 5 is a detailed sectional view of a rail raising and lowering mechanism, which is in such a condition as allowing a movement of the slitting equipment.
Figure 6:
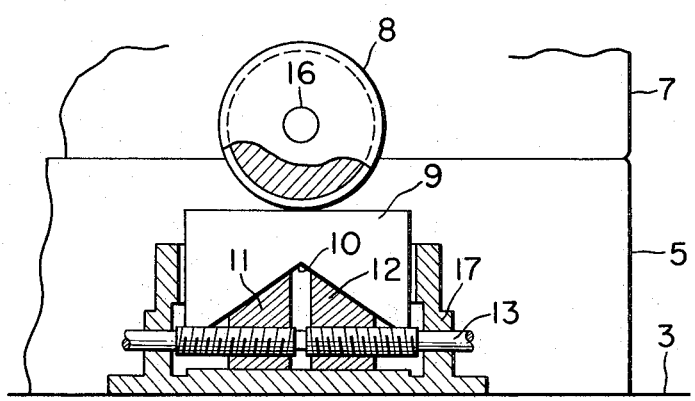
FIG. 6 is a view corresponding to FIG. 5, but the rail raising and lowering mechanism is in such a condition as allowing the slitting equipment to be held stationary.

In FIGS. 4 to 6, means for movably supporting the rail portion 9 is shown, which means comprises a pair of slidable members 11 and 12 provided with threaded bores and having top surfaces thereof tapered oppositely outwardly to receive thereon a complementary bottom 10 of the rail portion 9 which is formed in an inverse V-shape, a threaded rod 13 provided with left- and right-handed screws for threadedly engaging the bores in the slidable members 11 and 12, and a bearing stand 17 for the rod 13 the upper extension of the stand 17 also acts as a guide a raising and lowering movement of the rail portion 9. It will therefore be understood that upon rotation of the rod 13 the slidable members 11 and 12 move in opposite directions along the rod 13. In the case of outward movement of the slidable members 11 and 12, as shown in FIG. 5, the rail portion 9 is raised through the tapered surfaces of the slidable members 11 and 12 and supports the associated wheel 8 of the slitter, the latter being in the movable condition, and in the case of inward movement of the slidable members 11 and 12, as shown in FIGS. 4 and 6, the rail portion 9 is lowered and consequently the slitter base 7 is carried by the support structure 5 instead of its wheels 8 being supported by the rail portions 9. Thus, the slitter is brought into an immovable condition. In order to ensure that the slitter is maintained in such immovable condition, a clamp means is provided as shown in FIG. 4, which clamp means comprises a fluid operated actuator or cylinder 15 mounted within the support structure 5, and a clamping arm 14 is connected to a reciprocating part of the actuator 15 to force the base 7 of the slitter against the upper surface of the structure 5. It is understood that the slitter is clamped when the reciprocating part retracts in the actuator 15.

Figure 3:
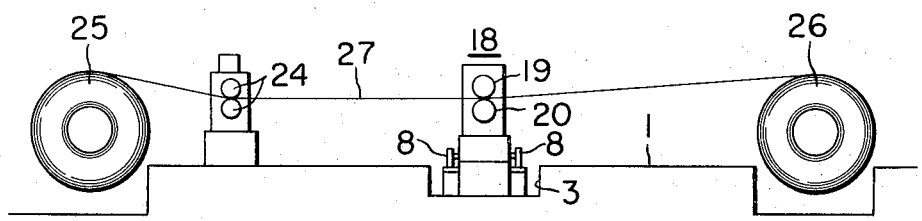
FIG. 3 is a schematic view of a slitting system using the apparatus of FIG. 1.

In operation, as shown in FIG. 3, a sheet-metal 27 wound on a pay-off reel 25 is re-wound, through a nip between pinch rolls 24, on a tension reel 26 after having been slitted into several strips by the slitter 18 placed in the slitting position thereof. When the shear cutting edges of the slitting elements 19 and 20 become dull and it is desired to exchange the slitter 18 in the slitting position thereof with the spare slitter 18', the clamp means is first loosened and the rail raising and lowering mechanisms are operated to raise the rail portions 9 until each rail portion 9 is flush with the rail remainder, whereby the slitter 18 is also raised into the movable condition. This condition is shown in FIGS. 1 and 2. The raised slitter 18 is pushed onto the side track 30 on the truck 29. At this time, both the slitter 18 and the spare slitter 18' are on the truck 29. Thereafter, the truck 29 with the slitters 18 and 18' is caused to run along the rails to bring the spare slitter 18' into alignment with the main track 2. The spare slitter 18' is then moved from the truck 29 along the main track 2 to the slitting position, i.e., onto the rail portions 9 held flush with the main track 2. The installation of the spare slitter 18' in the slitting position thereof is completed by clamping the slitter base 7 against the support 5 after having lowered the rail portions 9. The dulled slitting elements 19 and 20 of the slitting equipment 18 can be repaired or exchanged with new slitting elements during a slitting operation by the spare slitting equipment 18'.

While the invention has been illustrated and described with reference to a single preferred embodiment thereof, it is to be understood that various changes in the details of constructions and the arrangement and combination of parts may be made without departing from the spirit and scope of the invention.

What we claim is:

1. An apparatus for interchanging sheet metal slitting equipment, comprising:
    a first slitting appratus comprised of a first wheeled base and normally arranged in a slitting position thereof;
    a second slitting apparatus comprised of a second wheeled base and normally arranged in a stand-by position thereof, said second wheeled base of said second slitting apparatus being identical with said first wheeled base of said first slitting apparatus;
    a pair of parallel rails which form a main track each of said rails including separable rail portions formed in an inverse V-shape and arranged so as to allow either said first or second slitting apparatus, when either said first or second wheeled base thereof travels on said rail portions, to reach the slitting position of said system;
    a plurality of pairs of parallel rails forming side-tracks flush with said main track, each of said side tracks being formed by one pair of said parallel rails spaced to correspond to a spacing of said main track, and each of said side-tracks being arranged so as to allow either said first or second slitting apparatus, when either said first or second wheeled base thereof rides on one of said side-tracks to be transferred to said stand-by position thereof;
    a side-track bearing truck movable to bring either of said side-tracks into alignment with said main track, thereby enabling either said first or second slitting apparatus to move between said slitting position and said stand-by position;
    means for lowering and raising each of said rail portions of said main track operatively connected thereto, either said first or second slitting equipment in said slitting position being supported by said rail portions when said rail portions are raised, said means for lowering and raising each of said rail portions comprised of a pair of slidable members located beneath said rail position and provided with thread bores and having top surfaces thereof tapered oppositely outwardly to receive thereon said complementarily shaped bottom of said rail portion, a threaded rod provided with left-and right-handed screws for threadedly engaging said bores in said slidable members, and a bearing stand for said rod; and
    stationary means for supporting either said first or second slitting equipment in said slitting position when said rail portions are lowered.

2. The combination of claim 1, further comprising a floor provided with a first recess in which said means for lowering and raising each of said rail portions and said stationary means for supporting either said first or second slitting equipment are mounted, and a second recess in which said side-track bearing truck is mounted, said truck being provided with wheels movable on a pair of parallel rails disposed on a bottom of said second recess.

3. The combination of claim 1, further comprising a clamp means for enabling either said first or second slitting equipment to be firmly held in said slitting position.

* * * * *